May 11, 1965     H. HURWITZ, JR., ETAL     3,183,380
ELECTRODE STRUCTURE FOR MAGNETOHYDRODYNAMIC DEVICE
Filed June 2, 1961
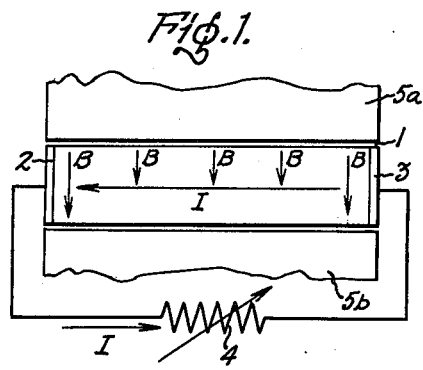
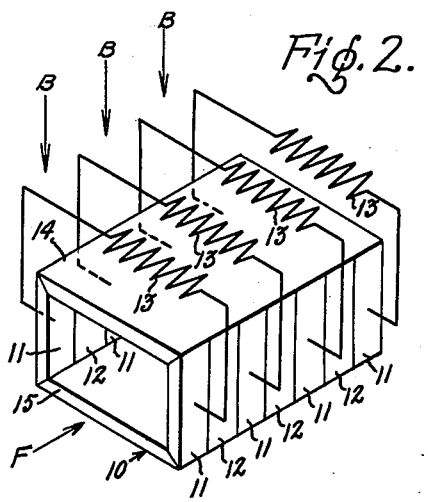
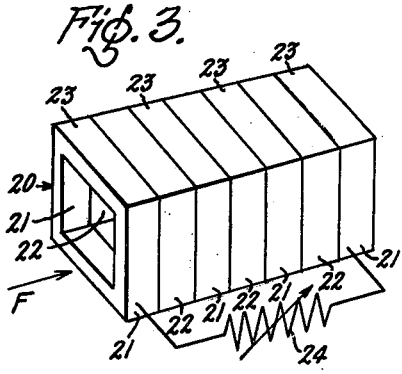
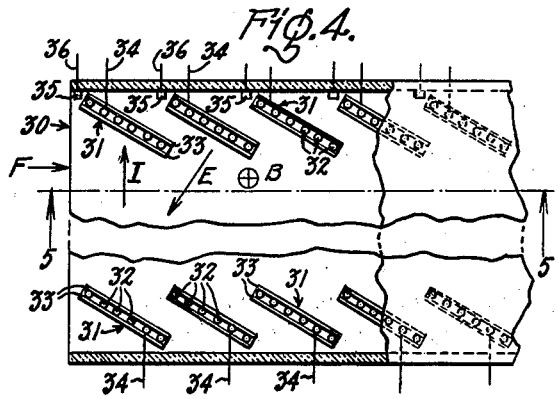
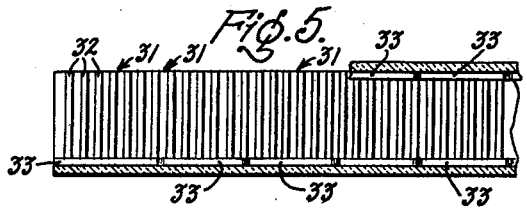
Inventors
Henry Hurwitz, Jr
George W. Sutton
by Paul A. Frank
Their Attorney United States Patent Office 3,183,380
Patented May 11, 1965

3,183,380
ELECTRODE STRUCTURE FOR MAGNETO-
HYDRODYNAMIC DEVICE
Henry Hurwitz, Jr., Schenectady, N.Y., and George W.
Sutton, Lafayette Hill, Pa., assignors to General Electric Company, a corporation of New York
Filed June 2, 1961, Ser. No. 114,434
6 Claims. (Cl. 310—11)

This invention relates to apparatus for generating electrical power, and more particularly, to an improved electrode structure for apparatus for generating direct current power by the interaction of a moving, conducting fluid and a magnetic field.

Conventional rotating devices for generating electricity are based on the principle of first converting heat energy to rotational mechanical energy, typically in a prime mover such as steam turbine, and then converting the mechanical energy into electrical energy by driving a metallic conductor through a magnetic field. For economical operation of such turbine-powered generating systems, high thermal conversion efficiencies in the steam turbine are imperative. The various improvements in turbine efficiencies that have been affected in the past have been achieved by operating at ever higher temperatures and pressures. As these rise, the problems they generate multiply so rapidly that a limit is quickly reached in what may be accomplished by further increases in operating temperatures and pressures. Probably the greatest difficulties arise in the materials area, since the mechanical stresses on moving parts such as turbine blades, shafts, etc., become progressively more severe as operating temperatures and pressures increase. Consequently a "diminishing returns" effect has set in and improvements in efficiency have been achieved in smaller and smaller increments and at higher and higher costs. Many of these difficulties can be avoided and radical improvements in conversion efficiencies can be affected by completely eliminating those elements which limit performance by devising a system that does not have any moving mechanical components.

To this end it has been proposed to generate electricity by abstracting energy from a moving conducting fluid, preferably a gaseous one, as it passes through a magnetic field. By using a fluid conductor in place of a solid one, the conductor may be driven through the magnetic field without employing rotating or moving parts parts merely by impressing a pressure difference on the fluid. Mechanical prime movers, such as turbines, are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid and a magnetic field will be magnetohydrodynamic generation or MHD generation.

A typical example of an MHD generating system as conceived by previous workers in the field is described in detail in Patent No. 1,717,413, issued June 18, 1929, to R. Rudenberg, which contemplates bringing a gas stream to a conducting condition by heating it to a temperature at which it becomes partially ionized. The ionized gas stream is driven through a magnetic field by a pressure difference, causing an electromotive force (E.M.F.) to be generated in the gas. Under the influence of this E.M.F. such charged particles as are present in the gas are deflected to a pair of electrodes causing a unidirectional current to flow through an external load circuit connected to the electrodes.

Other MHD generators have been proposed which use pairs of segmented electrodes; that is, the two electrodes of the Rudenberg device are divided into segments insulated from each other and with individual loads connected between electrodes of each pair. Another generator, which utilizes the Hall effect to produce electric current, has the load connected between electrodes at opposite ends of the flow path with the electrodes of each intermediate pair shorted together. In all of these direct current MHD generators, it has been found that the current is concentrated at one edge of the electrode. This, of course, causes a "hot spot" which tends to destroy the electrode quickly. Accordingly, it is a primary object of the present invention to provide an electrode structure whereby the current does not tend to concentrate on one edge of the electrode.

A further object of the invention is to provide an electrode structure which does not substantially impede the flow of conducting gas and which may be arranged for optimum current flow.

Other objects and advantages of the invention will become apparent as the description proceeds.

The various objects and advantages of the invention are realized by providing an electrode structure comprising a plane grid array of spaced, electrically connected, conductors that extend into the gas flow path at a suitable angle or inclination. Thus, there are no "hot spots" on the electrode and the flow of gas is not substantially impeded.

The invention may be better understood by reference to the following description, taken in conjunction with the accompanying drawing, in which:

FIGURE 1 is a diagrammatic cross-sectional view of a typical direct current MHD generator;

FIGURES 2 and 3 are diagrammatic perspective views of other MHD generators in which the present invention may be used;

FIGURE 4 is a diagrammatic plan view, partially broken away, of an embodiment of the invention; and FIGURE 5 is a diagrammatic vertical sectional view taken on the line 5—5 of FIGURE 4.

Before discussing and MHD generator electrode constructed according to the principles of the invention, it will be useful to discuss some pertinent physical properties of gaseous fluids; the conditions under which they become conducting; and the manner in which this conductive condition may be achieved to facilitate interaction with a magnetic field. The basic properties of pure gases or of gas mixtures, such as air, are such that under normal circumstances of temperature and pressure the conductivity of the gas is so low that for all practical purposes the gas is non-conducting and no interaction with a magnetic field is possible. To achieve any significant results, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and give rise to current conduction by interaction with a magnetic field.

The gas may be ionized in any one of several ways, as by thermal ionization, electric field ionization, X-ray ionization, arc discharge ionization, etc. Because of the relative ease and effectiveness with which it may be carried out, the preferred method in MHD generating systems is by thermal ionization; i.e., adding heat energy to the gas until some of the gas molecules lose electrons. The thermal ionization process is, however, severely temperature dependent, and is also a discontinuous phenomenon; i.e., there is a critical limiting threshold temperature below which no ionization takes place. The ionization energy, by which is meant the thermal energy increment which must be added to the molecules to initiate ionization and tear loose one or more of their electrons, is quite high for most gases. Common gases, such as air, CO, $CO_2$, as well as noble gases, show no perceptible ionization unless the gas is heated above a threshold temperature of approximately 3500° K. (6800° F.). It will be appreciated that the problems involved in heating the gas to an operating temperature, which must be even higher than the ionization threshold temperature of 3500° K., are substantial both in terms of the magnitude of the effort required to heat the gas and in terms of the problem of finding materials capable of withstanding such temperatures.

Fortunately, these difficulties may be greatly reduced by a technique which substantially lowers the critical threshold temperature for ionization. It has been found that by adding a small amount, in the range of 0.1–1% by volume, of some easily ionizable material such as an alkaline metal vapor, for example, the threshold ionization temperature is reduced by as much as 40–50%. For example, by "seeding" clean air through the addition of 1% or less by volume of potassium vapor, the critical ionization threshold temperature is reduced from approximately 3500° K. (6800° F.) to approximately 2000° K. (4100° F.). Cesium (Cs), potassium carbonate ($K_2CO_3$), cesium carbonate ($CsCO_3$) are additional examples of alkaline metal vapors or compounds which are effective for this purpose. For a more thorough discussion of electrical conductivity and ionization phenomena, reference is hereby made to the text "Introduction to the Theory of Ionized Gases," by J. L. Delcroix, Interscience Publishers, Inc., New York, N.Y., 1960.

The conducting gas after seeding is in suitable condition for expansion through a conventional expansion nozzle, after which it is caused to pass through a magnetic field of suitable configuration to establish a current within the conducting gas. The manner in which direct current is generated within the gaseous fluid may be most easily understood in connection with the diagrammatic illustrations of FIGURES 1–3 of the accompanying drawing. In FIGURE 1, a conventional prior art D.C. MHD arrangement is shown as including an elongated rectangular fluid passage or duct 1, extending into the plane of the paper. Metallic electrodes 2 and 3 are disposed in the duct and are connected to a load circuit which, for simplicity of explanation and illustration, is shown as a simple variable resistance 4. The duct is disposed between the pole pieces 5a and 5b of a suitable magnet. If the direction of gas flow is into the plane of the paper and a magnetic field of constant flux density is applied at right angles to the direction of flow, as illustrated by the arrows labeled B, an E.M.F. is generated in the conducting gas at right angles both to the field and to direction of flow. This E.M.F. acts on the free electrons in the ionized gas and causes an electron current to flow between electrodes 2 and 3 and through the load 4 in the direction shown by the arrow I. If the direction of gas flow is reversed, the current flow is in the opposite direction.

It is well known that a gaseous conducting medium flowing through a transverse magnetic field sets up an electric current in the direction of gas flow. Therefore, if electrodes are used which are long in the axial direction, they provide a return path for the current that is caused to flow in the axial direction. This phenomenon is known as the Hall effect, and the current which flows as a result thereof is known as the Hall current. In a direct current MHD generator of the general configuration of that shown in FIGURE 1, a Hall current will flow, and the current flowing between the two electrodes is reduced.

FIGURE 2 illustrates diagrammatically a direct current magnetohydrodynamic generator in which the Hall current is eliminated. In this case, a flow path or duct 10 has side walls which consist of a plurality of pairs of electrodes 11, with the electrodes on each side being separated by an insulating material 12. The two electrodes 11 of each pair are directly opposite each other in the duct, and individual loads 13 are connected between the two electrodes of each pair. The top and bottom walls 14 and 15 of the duct are, of course, constructed of an insulating material. In this arrangement, because there is no continuous electrode to provide a return path for the Hall current, that current cannot flow. Therefore, the electric field which exists in the direction of gas flow F continues to exist and provides heating of the electrons in the gaseous working medium.

FIGURE 3 illustrates diagrammatically a direct current MHD generator in which the Hall current itself is utilized to supply an electric load. Such a device is disclosed in detail in patent application Serial No. 60,994, filed October 6, 1060, by Cobine and Harris, now Patent 3,149,247, granted September 15, 1964, and assigned to the assignee of the present invention.

Briefly, such a generator utilizing the Hall effect comprises a flow passage or duct 20 provided with segmented pairs of electrodes 21 spaced along the direction of fluid flow and separated by insulating spacers 22. Each pair of electrodes 21 is electrically connected by a bar or strip of conducting material 23 to complete a current path for the transverse electric current generated by the flow of gaseous conducting fluid through the magnetic field B applied across the duct. The Hall current generated axially is utilized to supply an electric load 24 connected between axially displaced electrodes, which, in the device illustrated, are those farthest apart, although other pairs of electrodes may be utilized for the purpose.

In each of the direct current MHD generators shown in FIGURES 2 and 3, it has been found that the current flowing between the electrodes of each pair tends to concentrate on one edge of each electrode. This occurs because the electric field existing within the duct is not perpendicular to the planes of the electrodes but has an axial component in the direction of gas flow. The reason for this effect is explained in detail in an article entitled "Influence of Tensor Conductivity on Current Distribution in an MHD Generator," by Hurwitz, Jr., Kilb, and Sutton, published in the Journal of Applied Physics, vol 32, No. 2, pages 205–216. The effect of such a current concentration is to cause erosion and consequent destruction of the electrode material and also to tend to reduce the current developed through the MHD generator. This difficulty may be avoided through the teachings of the present invention by utilizing an electrode structure comprising a grid array of spaced, electrically connected, conductors that extend into the gas flow path at a suitable angle.

FIGURES 4 and 5 illustrate an embodiment of the present invention which may be applied to generators of the types shown in FIGURES 2 and 3. A duct 30 is provided having four insulating walls and into which a plurality of plane grid electrode arrays 31 extend at a suitable angle. Each of the arrays 31 comprises a plurality of spaced, electrically connected, conductors 32 that are mounted between pairs of tracks 33 suitably secured on opposite walls of the duct 30. The tracks 33 may be electrically conductive with a conductor 34 secured to each track and extending out through the adjacent wall of the duct; thus, all of the conductors 32 in each array 31 are electrically connected together. Alternatively, the conductors 32 may be individually inserted in suitable openings in the walls of the duct, rather than in tracks such as illustrated, and electrically connected together externally of the duct. Thus, they may be easily replaced if any erosion does take place. Also, the conductors may be hollow, so that a suitable cooling fluid may be passed through them.

As seen in FIGURE 4, the planes of all of the arrays 31 are parallel and perpendicular to the electric field, shown by the arrow marked E. The arrays on each side of the duct are arranged opposite each other so that the current, shown by the arrow marked I, may flow transversely across the duct between opposing arrays. In the particular case illustrated, the direction of gas flow is as shown by the arrow marked F, and the magnetic field is into the plane of the paper, as shown at B. The plane on each array 31 is, of course, parallel to the direction of magnetic flux and the angle or inclination that the various arrays make with the sides of the duct is determined by the angle of the electric field existing in the duct. The angle of the electric field in the duct is determined by the desired direction of current flow and by the desired ratio of open circuit voltage to load voltage. This angle may be determined mathematically by one skilled in the art or, as is more likely to occur in practice, it may be determined empirically. The length of each array or the number of conductors of each array is determined by a balance between obtaining the highest current flow possible while least impeding the flow of the conducting fluid through the duct. Even though the conductors 32 that comprise each array 31 are spaced apart from each other, there will, nevertheless, be some impeding of the flow of the conducting gas, even though it will be relatively small. Therefore, the length of each array should be determined empirically with regard to the factors previously mentioned.

If the grid electrode arrays of the invention are used in a direct current generator of the type shown generally in FIGURE 2, the conductors 34 of opposite arrays may be connected to an external load, thus individual loads are provided for each pair of arrays. If the invention is used in a Hall current generator of the type shown in FIGURE 3, the leads 34 of opposite pair of arrays may be shorted together externally of the duct with the external load connected between pairs at opposite ends of the duct.

It has been found desirable under certain conditions to increase the normal operational electron emission from each cathode electrode by means of a "keep-alive" voltage applied between the cathode electrode and a small auxiliary anode located adjacent to each cathode electrode. As seen in FIGURE 4, a "keep-alive" anode 35 having a lead conductor 36 is located adjacent each array 31 of the cathode electrodes, which, with the illustrated conditions of gas flow, magnetic field, and current, are the upper arrays in the figure. A voltage source may be connected between the conductors 36 and 34 of each adjacent "keep-alive" anode 35 and array 31 to provide a current flow between the two elements of a relatively few amperes. It is also pointed out that the use of a "keep-alive" anode may be desirable when using solid electrodes rather than the grid array of the present invention.

It is now apparent that the invention meets all of its stated objectives in providing an improved electrode structure in which the MHD current does not tend to concentrate on one spot on the electrode, which does not substantially impede the flow of conducting gas, and which may be arranged for optimum current flow. It is obvious to those skilled in the art that many variations and modifications of the disclosed embodiment of the invention may be made without departing from the spirit and scope of the invention. Therefore, the invention is to be considered as limited only in accordance with the teachings thereof as set forth in the appended claims.

What we claim as new and desire to secure by Letters Patent of the United States is:

1. In a magnetohydrodynamic device having a flow path for a conductive fluid and a magnet field extending transversely across the flow path, the combination comprising a pair of electrodes disposed on opposite sides of and inclined at a predetermined angle with respect to said flow path and each comprising an array of spaced conductors arranged parallel to said magnetic field.

2. In a magnetohydrodynamic device having a flow path for a conductive fluid and a magnetic field extending transversely across the flow path, the combination comprising a pair of electrodes disposed on opposite sides of and inclined at a predetermined angle with respect to said flow path and each comprising a plane array of spaced electrically connected conductors arranged with the plane of said array parallel to said magnetic field.

3. In a magnetohydrodynamic device having a flow path for a conductive fluid and a magnetic field extending transversely across the flow path, the combination comprising a pair of electrodes disposed on opposite sides of and inclined at a predetermined angle with respect to said flow path and each comprising a plane array of spaced electrically connected conductors arranged with the planes of said arrays parallel to each other and to said magnetic field.

4. In a magnetohydrodynamic device having a flow path for a conductive fluid and a magnetic field extending transversely across the flow path, the combination comprising a pair of electrodes disposed on opposite sides of and inclined at a predetermined angle with respect to said flow path and each comprising a plane array of spaced electrically connected conductors arranged with the planes of said arrays parallel to each other and to said magnetic field, and normal to an electric field existing within said duct by interaction of said magnetic field and the conductive fluid.

5. In a magnetohydrodynamic device including a conduit defining a flow path for a conductive fluid and magnetic field producing means providing a magnetic field extending transversely across the flow path, a plurality of mutually insulated pairs of electrodes disposed on opposite sides of and inclined at a predetermined angle with respect to said flow path and providing opposed electrode surfaces substantially perpendicular to the direction of the electric field induced in said conducting fluid by the interaction of said conducting fluid and the magnetic field produced by said magnetic field producing means when said device is operating with a longitudinal component of electric field.

6. In a magnetohydrodynamic device including conduit means establishing a flow path for conductive fluid and magnetic field producing means for establishing a magnetic field extending transversely across said path, the combination comprising a plurality of pairs of electrodes spaced along the flow path with the electrodes of each pair located on opposite sides of the flow path and insulated from the electrodes of the remaining pairs, said electrodes being inclined at an angle to said flow path and presenting a projected area facing said flow path, said electrodes also being provided with passages therethrough to minimize the impedance to the flow of conducting fluid along said flow path resulting from the presence of said electrodes.

References Cited by the Examiner
UNITED STATES PATENTS
2,896,451    7/59    Rinia _____ 310—11
FOREIGN PATENTS
841,613    6/52    Germany.

OTHER REFERENCES

Publication: Engineering Aspects of Magnetohydrodynamics, edited by Mannal and Mather, pages 22, 27, 51, 59 and 60; compilation of papers delivered March 9 and 10, 1961, at the Second Symposium.

MILTON O. HIRSHFIELD, *Primary Examiner.*

ORIS L. RADER, DAVID X. SLINEY, *Examiners.*